US008738816B2

(12) United States Patent
Desai (10) Patent No.: US 8,738,816 B2
(45) Date of Patent: May 27, 2014

(54) MANAGEMENT OF DETECTED DEVICES COUPLED TO A HOST MACHINE (75) Inventor: Kashyap D Desai, Bangalore (IN)

(73) Assignee: LSI Corporation, Milpitas, CA (US)

( * ) Notice: Subject to any disclaimer, the term of this patent is extended or adjusted under 35 U.S.C. 154(b) by 140 days.

(21) Appl. No.: 12/916,491

(22) Filed: Oct. 30, 2010

(65) Prior Publication Data

US 2012/0110211 A1    May 3, 2012

(51) Int. Cl.
 *G06F 3/00* (2006.01)
(52) U.S. Cl.
 USPC .................................. 710/9; 710/17; 710/19
(58) Field of Classification Search
 USPC .................................................. 710/9, 17, 19
 See application file for complete search history.

(56) References Cited

U.S. PATENT DOCUMENTS

| 7,668,986 | B2 * | 2/2010 | Lowe et al. ..................... 710/62 |
| 2001/0011348 | A1 * | 8/2001 | Blumenau et al. ............ 713/100 |
| 2005/0185599 | A1 * | 8/2005 | Clayton ........................ 370/254 |
| 2009/0024746 | A1 * | 1/2009 | Welch .......................... 709/228 |
| 2010/0153600 | A1 * | 6/2010 | Sthoeger et al. .............. 710/110 |

\* cited by examiner

*Primary Examiner* — Zachary K Huson
(74) *Attorney, Agent, or Firm* — Raj Abhyanker, P.C.

(57) ABSTRACT

In one embodiment, a method includes detecting a coupling of a device to an interface of the host machine. The method also includes determining, through an operating system of the host machine whether the device coupled to the interface of the host machine is same as another device that is formerly coupled to the interface of the host machine as indicated in a topology file of the operating system. In addition, the method includes modifying the topology file maintained in the operating system to remove a mapping information of the other device that is formerly coupled with the interface of the host machine in the topology file to logically decouple the other device from the interface of the host machine and to add a mapping information of the device coupled with the interface in the topology file to logically couple the device with the interface of the host machine.

20 Claims, 4 Drawing Sheets

PROCESS FLOW 450

MANAGEMENT OF DETECTED DEVICES COUPLED TO A HOST MACHINE

FIELD OF TECHNOLOGY

This disclosure generally relates to detected external devices and management of external devices and, more particularly, to a method and system to manage detected devices coupled to a host machine.

BACKGROUND

An external device such as a storage device may be coupled to a host machine through an interface provided in the host machine. A firmware of the host machine may be configured to manage the external device coupled to the host device. The firmware may map the external device to the interface of the host machine. In some cases, the firmware may map more than one external device to the interface of the host device. One example is a case where a device coupled to the interface is accidently removed and another external device is coupled to the same interface of the host machine. In such a case, the firmware may maintain mapping of more than one external device to the interface. However, an operating system may not allow such mappings in the operating system layer. Therefore, in such cases, the operating system may not allow communication of the external device with the operating system. Consequently, a newly added device may not be detected immediately.

SUMMARY

Disclosed are a method, a machine readable medium and/or a system to manage devices coupled to a host machine. In one aspect, a method includes detecting at least one of a removal and an addition of a device couples to an interface of a host machine. In addition, the method includes modifying a mapping information of the device in a topology file of an operating system associated with the host machine based on at least one of the removal and the addition of the device. The method further includes updating a configuration file of a firmware of the host machine to comprise the mapping information of the device after the topology file is modified.

The method further includes proactively removing a corresponding mapping information of another device that is formerly attached from the topology file to logically decouple the other device that is formerly attached from the interface of the host machine when the addition of the device is detected. The method also includes adding the mapping information of the device to the topology file to logically couple the device with the interface of the host machine. The method also includes designating the device as active through the firmware. The method further includes designating the other device that is formerly attached as inactive through the firmware. The method further includes deleting the corresponding mapping information associated with the other device that is formerly attached from the configuration file of the firmware after the topology file is modified. The method also includes adding the mapping information associated with the device that is currently attached to the configuration file of the firmware after the topology file is modified.

The method also includes determining through the operating system of the host machine, that the mapping information associated with the device is distinct from the corresponding mapping information associated with the other device that is formerly attached.

The method further includes configuring, through the operating system of the host machine, the interface of the host machine to enable a communication between the device and the operating system. The method also includes adding the mapping information associated with the device to the topology file of the operating system of the host machine. The method also includes adding the mapping information associated with the device to the configuration file of the firmware after the mapping information has been added to the topology file. The configuration file is a file maintained in the firmware that comprises the mapping information of the interface of the host machine coupled with the device.

The method also includes requesting a pending Input data and an Output data(IO) prior to modifying the topology file maintained in the operating system of the host machine. The method also includes communicating an error IO to the operating system of the host machine when the device that is formerly attached is unavailable. The method also includes deleting the error IO when the device that is formerly attached is unavailable.

The method further includes resetting the interface of the host machine to enable a configuration of the interface of the host machine through the operating system for communication between the device and the operating system of the host machine.

The method also includes modifying the configuration file of the firmware to remove the corresponding mapping information associated with the other device that is formerly attached based on a modification of the topology file maintained in the operating system of the host machine. The method also includes updating the configuration file of the firmware to include the mapping information associated with the device based on a modification of the topology file maintained in the operating system of the host machine. The method also includes obtaining an information of the device through the interface of the host machine to assign a unique address and a unique identification to the device. The device coupled to the interface may be at least one of a storage device, an expander device, a data processing device and a network device.

The method also includes communicating a set of information from the device to the operating system through the interface of the host machine.

In another aspect, a system comprises a host machine comprising a processor, a memory and a storage, the processor may detect a coupling of a device to an interface of the host machine. The operating system of the host machine may determine that a mapping information associated with the device is distinct from the mapping information associated with an other device that is formerly attached as indicated in a topology file of the operating system when the processor detects a coupling of the device. The operating system may also modify the topology file maintained in the operating system to perform a removal of a corresponding mapping information associated with the other device that is formerly attached to logically decouple the other device that is formerly attached from the interface of the host machine when the processor detects a coupling of the device. The operating system may also modify the topology file maintained in the operating system to perform an addition of the mapping information associated with the device to logically couple the device with the interface of the host machine when the processor detects a coupling of the device. The firmware of the host machine may update the mapping information of the device in a configuration file after the topology file maintained in the operating system is modified.

The processor of the host machine may configure the interface of the host machine through the operating system to enable a communication between the device and the operating system. The device may be at least one of a storage device, an expander device, a data processing device and a network device. The firmware may be configured to maintain the mapping information of the interface of the host machine with the device in the configuration file. The operating system of the host machine may request pending Input data and Output data (TO) prior to modifying the topology file maintained in the operating system of the host machine.

The system may also comprise a driver of the host machine that may be configured to communicate an error IO to the operating system when the device that the formerly attached is unavailable. The system may also comprise a driver of the host machine that may be configured to delete the error IO when the device that is formerly attached is unavailable.

The operating system may reset the interface of the host machine to enable a configuration of the interface of the host machine through the operating system for communication between the device and the operating system of the host machine. The firmware may modify the configuration file to delete the corresponding mapping information associated with the other device that is formerly attached after the topology file maintained in the operating system is modified. The firmware may modify the configuration file to update the configuration file of the firmware to include a mapping information associated with the device after the topology file maintained in the operating system is modified. The operating system may obtain an information associated with the device through the interface of the host machine and may assign a unique address and a unique identification of the device, and may enable a communication between the device and the host machine through the interface of the host machine.

In yet another aspect a machine-readable medium providing instructions, which when read by a processor cause the machine to perform operations comprising detecting at least one of a removal and an addition of a device coupled to an interface of a host machine. The machine-readable medium providing instructions also includes proactively removing a corresponding mapping information associated with an other device that is formerly attached from the topology file of the operating system to logically decouple the other device that is formerly attached from the interface of the host machine when the addition of a device is detected. The machine-readable medium providing instructions also includes maintaining an instance of the mapping information associated with the other device that is formerly attached in a configuration file of a firmware of the host machine even after the mapping information is removed from the topology file of the operating system. The machine-readable medium providing instructions also includes updating the configuration file of the firmware based on a modification of the topology file of the operating system.

The machine-readable medium providing instructions also includes adding a mapping information associated with the device coupled to the interface of the host machine after the corresponding mapping information associated with the other device that is formerly attached is removed from the topology file. The machine-readable medium providing instructions also includes updating the configuration file of the firmware to include the mapping information of the device after the topology file has been modified.

The methods, systems, and apparatuses disclosed herein may be implemented in any means for achieving various aspects. Other features will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system to manage devices coupled to a host machine. Although the present embodiments have been described with reference to specific example embodiments, it will be evident that various modifications and changes may be made to these embodiments without departing from the broader spirit and scope of the various embodiments.

Figure 1:
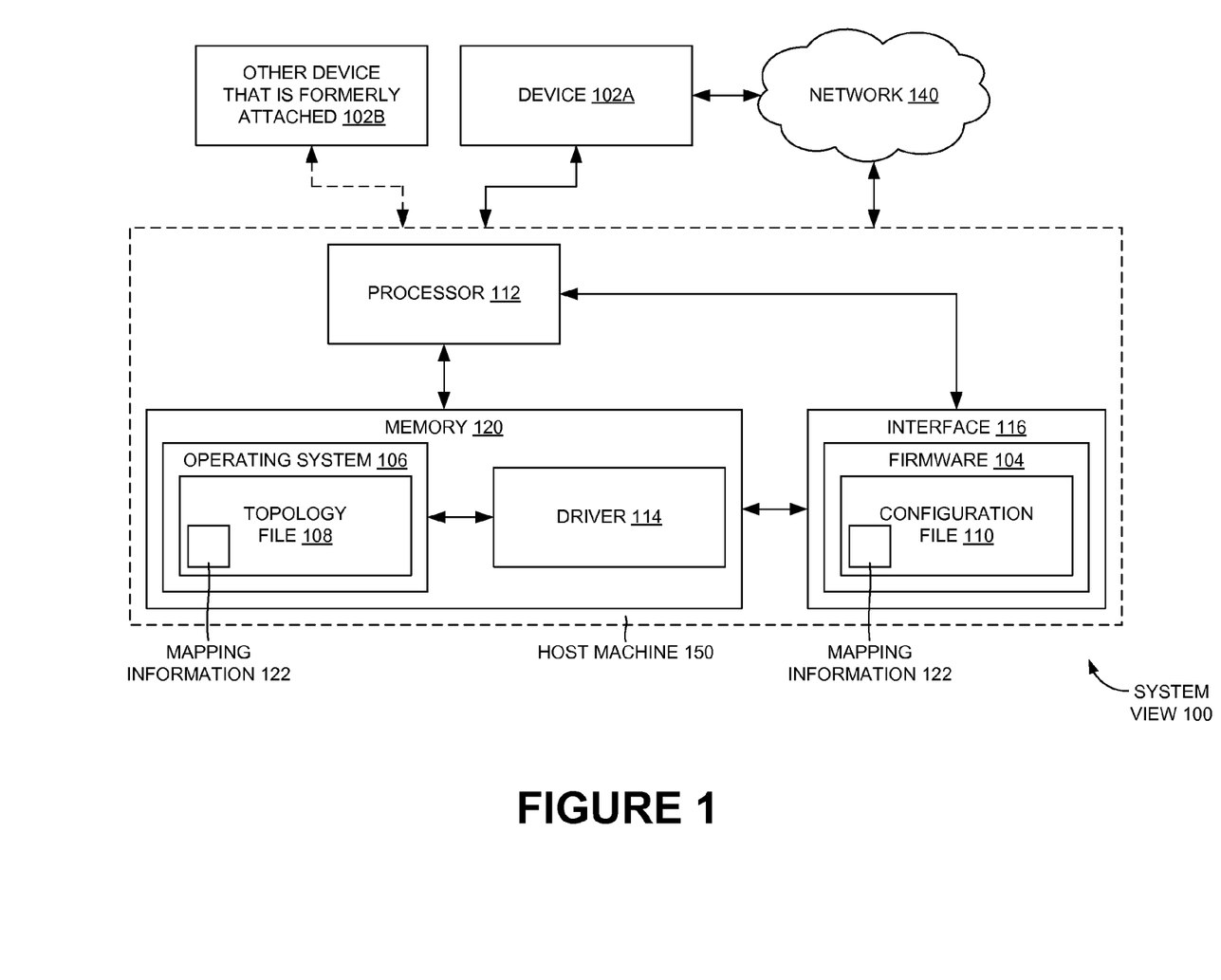
FIG. 1 is a schematic view of a host machine coupled to a device and an other device, according to one or more embodiments.

FIG. 1 is a schematic view of a host machine 150 coupled to a device 102A, according to one or more embodiments. In one or more embodiments of FIG. 1 the device 102A may be coupled to the host machine through a coupling means. In one or more embodiments, the device 102A may be coupled to the host machine directly through a USB port. In one or more embodiments, the device 102A may be coupled to the host machine through a network 140. The device 102A may be a storage device, an expander device, a data processing device and/or a network device. The device 102A may be a device that is currently attached, and device 102B may be an other device that is formerly attached to the host machine in one or more embodiments. The host machine 150 may include an interface 116 configured to be coupled to an external device, a network, and/or a network device. In one embodiment, the interface 116 may be a Host Bus Adapter (HBA). The interface 116 as described herein may be configured to enable communication between the host machine 150 and external device or the network. The external device may include, but is not limited to Small Computer System Interface (SCSI) devices, Fiber Channel device, external Serial Advanced Technology Attachment (eSATA), a Redundant Array of Independent Disks (RAID) device, an expander, Universal Serial Bus (USB) device, Compact Disc (CD), Digital Versatile Disc (DVD), and floppy disks. The interface 116 may include a hardware and a firmware 104 configured to communicate with an operating system 106 of the host machine 150 and the external device 102A or network communicatively coupled to the interface 116. In an example embodiment, the firmware 104 may be a program configured to control the interface 116. In another embodiment the operating system 106 may be implemented in a memory 120 of the host machine 150.

In one example embodiment, when an external device 102A is coupled to the interface 116, the firmware 104 may notify the driver 114 about the external device 102 coupled to the interface 116. In one or more embodiments, when the external device 102A is attached to the host machine through one of the coupling means mentioned above, the processor 112 may detect the addition of the external device 102A to the host machine 150. In one or more embodiments, the processor 112 may also detect that the other device that is formerly attached 102B has been decoupled from the host machine 150. Upon addition, a corresponding mapping information associated with the other device that is formerly attached 102B may be proactively removed from the topology file 108 maintained in the operating system 106. The firmware 104 may still maintain an instance of the corresponding mapping information associated with the other device that is formerly attached 102B in the configuration file 110. After the proactive removal of the corresponding mapping information of the other device that is formerly attached 102B, the mapping information 122 of the device 102A may then be added to the topology file 108 maintained in the operating system 106. Based on the modification made to the topology file 108, the firmware may then add the mapping information 122 associated with the device 102A to the configuration file 110 in one or more embodiments. In one or more embodiments, the firmware may then remove the corresponding mapping information associated with the other device that is formerly attached 102B from the configuration file 110. The firmware 104 may "add" the external device logically by adding a mapping information 122 associated with the coupling of the interface 116 with the external device in the configuration file 110 of the firmware 104. In one embodiment, the configuration file 110 may be a file maintained by the firmware 104 to maintain mapping information 122 of the interface 116 coupled with the external device 102, the network, and/or the network device. In addition, the firmware 104 may assign a unique ID and address to the external device.

Further, the driver 114 may communicate a request to the operating system 106 to configure the interface 116 to enable a communication between the operating system 106 and the external device coupled the interface 116. The operating system 106 may configure the interface 116 in response to the request by communicating one or more protocol requests to the interface 116 to cause the interface 116 to establish a communication path between the operating system 106 and the external device 102. Furthermore, the operating system 106 may input a mapping information 122 of the interface 116 with the external device 102 in the topology file 108 maintained in the operating system 106 using a processor 112.

When the external device is decoupled from the interface 116, the processor 112 of the host machine 150 may sense the decoupling of the external device. In addition, the processor 112 may communicate an information associated with the decoupling of the external device from the interface 116 to the operating system 106. The operating system 106 upon receiving the information from the processor 112 and may remove the mapping information 122 associated with the interface 116 and the external device in the topology file 108 of the operating system 106 using the processor 112 of the host machine 150. Further, the operating system 106 may request for the completed pending IO's from the driver 114. The driver 114, on receiving the request, may respond by communicating the error IO's to the operating system 106, additionally with a standard protocol message indicating that the driver 114 is not able to connect to the external device 102. Upon logical removal of the external device from the operating system 106, the firmware 104 may logically remove the external device by resetting the interface 116. In addition, the firmware 142 may also remove the mapping information 122 associated with the interface 116 and the external device 102 in the configuration file 110 of the firmware 104 using the processor 112 of the host machine 150.

In one embodiment, in case of "hot plug" external devices, the external devices may be coupled to the interface 116 and may be removed at any point of time. In such scenarios, the operating system 106 may be configured to remove the external device 102 logically from the operating system memory (e.g., topology file 108) and to reset the interface 116 when a physical decoupling of the external device from the interface 116 is detected.

Considering the case of "hot plug" external devices, when a first external device is coupled to the interface 116 of the host processing system, the interface 116 of the host machine 150 may be configured through the processor 112 to enable communication between the first external device and the operating system 106 as mentioned previously. In one embodiment, when the other device that is formerly attached 102B is physically decoupled and the device 102A is coupled to the interface 116, the firmware 104 may sense the change in external device 102A being coupled. The firmware 104 of the interface 116 may communicate "a link status change" or change in device being connected message to the driver 114.

In one embodiment, the processor 112 may communicate a change in the external device 102A in the interface 116 to the operating system 106. The processor 112 may also provide information associated with the other device that is formerly attached 102B coupled to the interface 100. The operating system 106 upon receiving the information associated with the other device that is formerly attached 102B may refer to the topology file 108 to determine whether the other device 102B is same as the device 102A. In a case when the processor determines that both devices are the same, there may not be any change in configuration.

In another case, the firmware 104 may add the device 102A logically by adding a mapping information 122 associated with the device 102A to the configuration file 1110 of the firmware 104. In addition, the firmware 104 may assign a unique ID and address to the device 102A. Also, the firmware 104 may communicate a request to the driver 114 to logically decouple the other device 102B. The driver 114 upon receiving the request may communicate a request to the operating system 106 to logically decouple the other device 102B.

Further, the operating system 106 may request for the completed pending IO's to the driver 114. The driver 114, upon receiving the request, may respond by communicating the error IO's to the operating system 106, with a protocol message indicating to the operating system 106 that the driver 114 is not able to connect to the other device 102B. Further, the driver 114 may communicate a request to the operating system 106 to logically couple the device 102A to the interface 116. The operating system 106 may add a mapping information 122 associated with the coupling of the interface 116 and the device 102A.

The driver 114 may communicate "a target reset" command to reset the interface 116. Upon logical removal of the other device 102B from the operating system 106, the firmware 104 may logically remove the other device 102B by resetting the interface 116. In addition, the firmware 104 may communicate the completed pending IO's to the driver 114. Further, the firmware 104 may also remove the mapping information associated with the interface 116 and the other device 102B in the configuration file 110 of the firmware 104 using the processor 112 of the host machine 150.

Further, the operating system 106 may configure the interface 116 to enable a communication between the operating system 106 and the device 102A coupled the interface 116. In one or more embodiments, the operating system 106 may configure the interface 116 by communicating one or more requests to the interface 116 to cause the interface 116 to establish a communication path between the operating system 106 and the device 102A.

Figure 2:
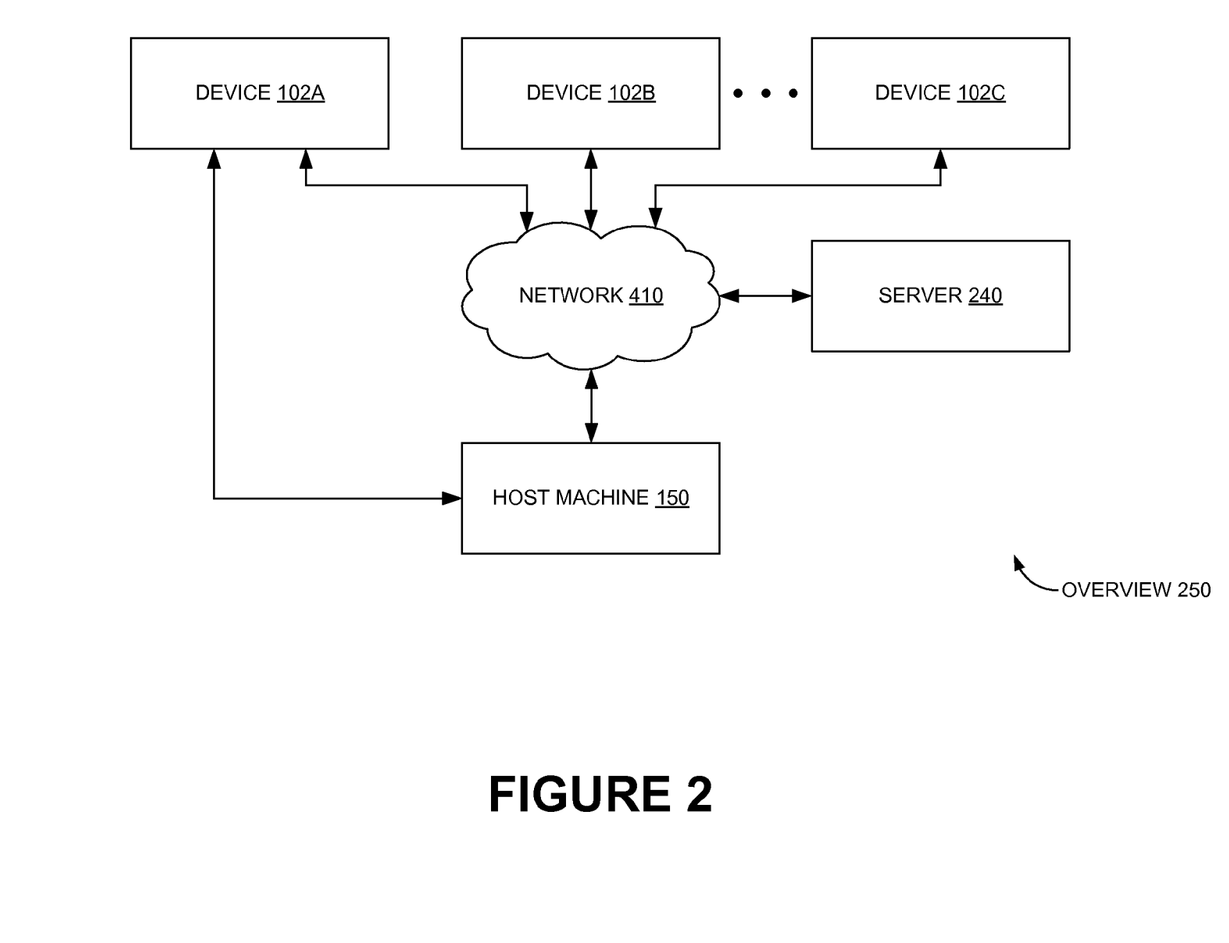
FIG. 2 is a system view illustrating management of the device and other devices through the host machine, according to one or more embodiments.

FIG. 2 is a system view 250 illustrating management of external devices through the host machine 150, according to one or more embodiments. In one or more embodiments, the host machine 150 as described herein may be a computing device such as a laptop computer, a mobile device, a notebook computer, or desktop computer or, server, or any other data processing device. The external devices may be coupled to the host machine 150 through the interface 116 provided thereof. The device 102 may be coupled directly or indirectly through a coupling means, also mentioned above, to the host machine 150. For example, a storage device 102A may be directly coupled as a mass storage device. In another example, the storage devices 102B, a database device and server 240 may be indirectly coupled to the host machine 150 through the network 140. In some embodiments, the Serial Attached SCSI (SAS) storage devices may also be coupled to the host machine 150 through expander devices.

Although, the devices aforementioned are coupled directly and indirectly, a method of managing the external devices is same as described in description of FIG. 1.

Figure 3:
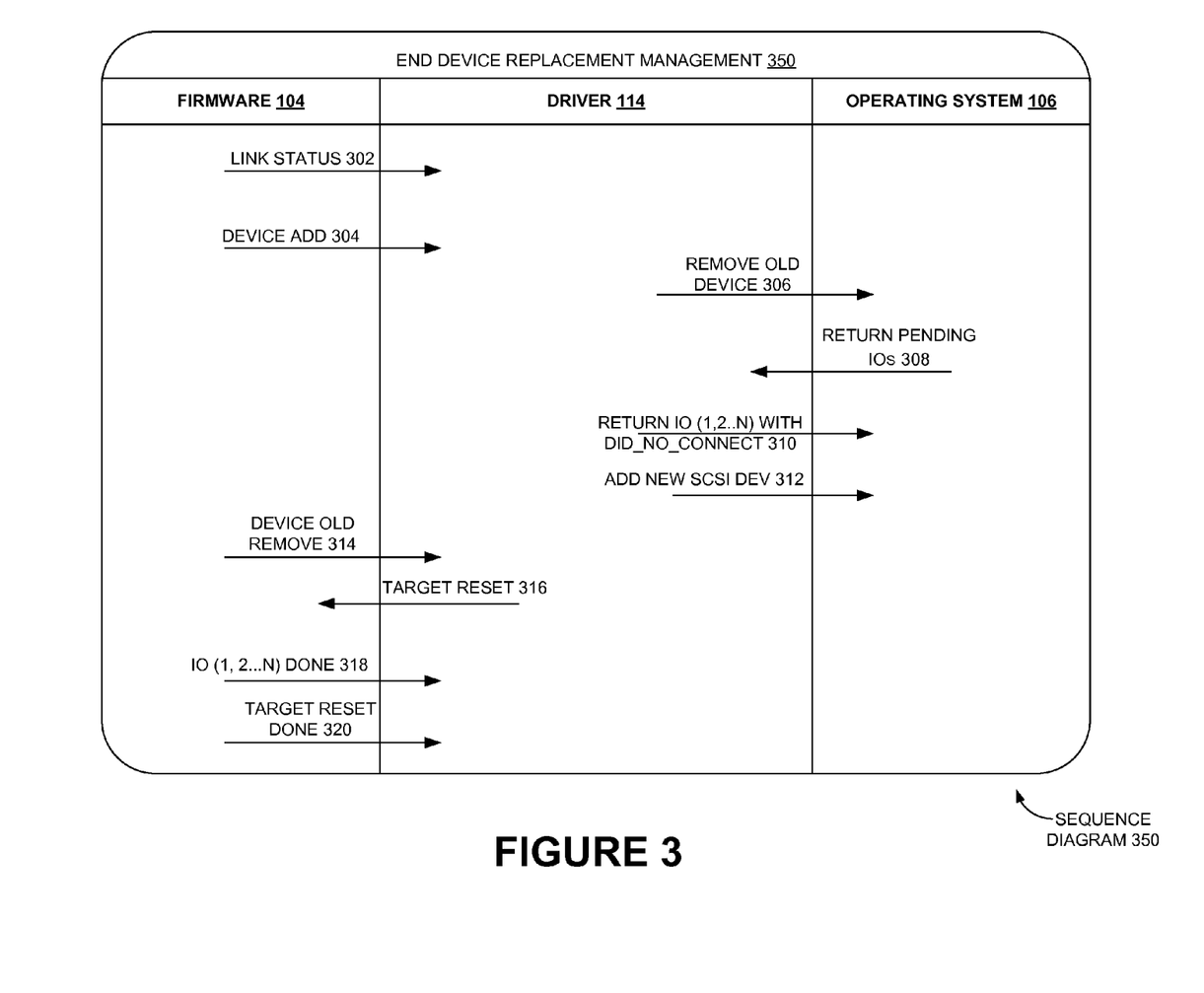
FIG. 3 is a sequence diagram illustrating a process of management of the device and other devices coupled to the interface, according to one or more embodiments.

FIG. 3 illustrates a sequence diagram 350 illustrating a process of management of end devices coupled to the interface 116, according to one or more embodiments. In operation 302, the firmware 104 of the interface 116 may communicate "a link status change" or "change in device connected" message to the driver 114. In one embodiment, the message may be communicated to the driver 114 indicating a change in an external device coupled to the interface 116. In another embodiment, the message may be communicated to the driver 114 because the device 102A may be coupled to the interface 116 which may have been configured for communication between the other device that is formerly attached 102B and the operating system 106. In operation 304, the firmware 104 may add the device 102A logically by adding mapping information 122 associated with the coupling of the interface 116 with the device 102A in the configuration file 110 of the firmware 104. In addition, in operation 304, the firmware 104 may communicate a request to the driver 114 to logically decouple the other device 102B. In operation 306, the driver 114 upon receiving the request from the firmware 104 may communicate a request to the operating system 106 to logically decouple the other device 102B. In one embodiment, the operating system 106 may decouple the other device 102B by removing a mapping information associated with the other device 102B and the interface 116.

In operation 308, the operating system 106 may request for the completed pending IO's from the driver 114. In operation 310, the driver 114, upon receiving the request IO's may return the error IO's to the operating system 106, with a standard protocol message indicating to the operating system 106 that the driver 114 is not able to connect to the other device 102B. Further, in operation 312, the driver 114 may communicate a request to the operating system 106 to logically couple the device 102A to the interface 100. Based on the request from the driver 114, the operating system 106 may add a mapping information 122 associated with coupling of the interface 116 and the device 102A. In operation 314, the firmware 104 may communicate a request to the driver 114 to logically decouple the other device 102B from the interface 116.

Figure 4:
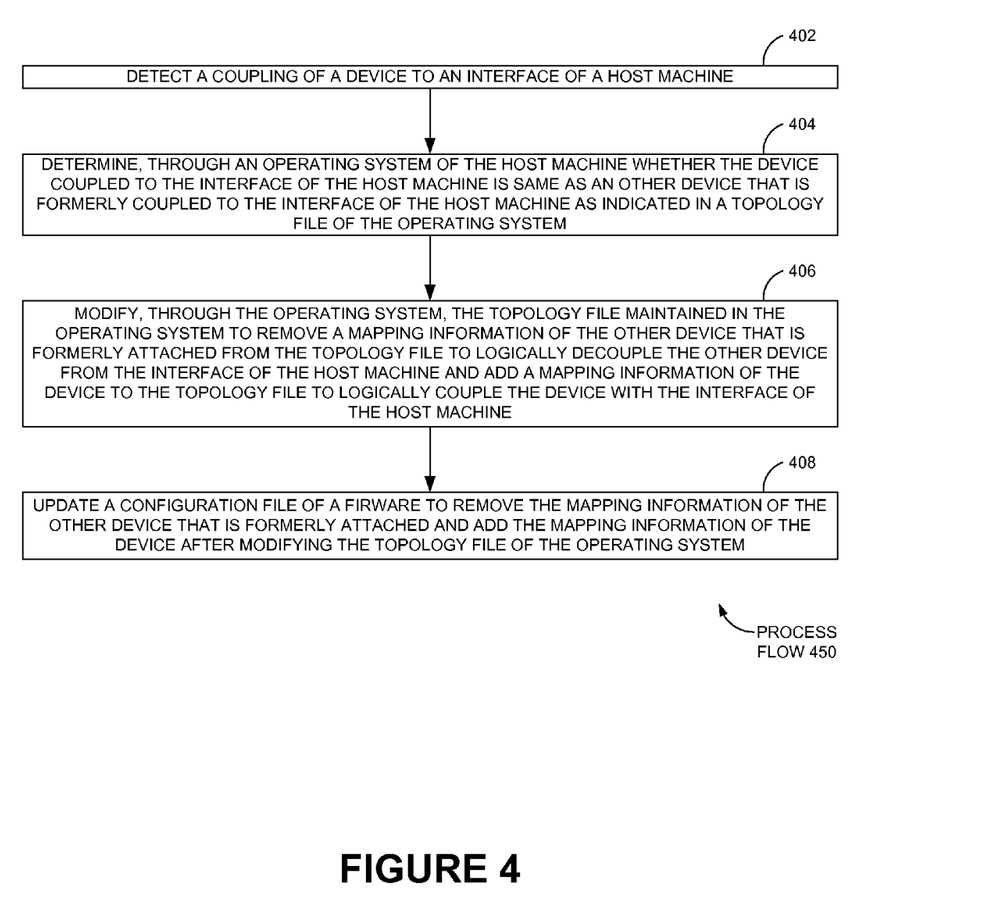
FIG. 4 is a process flow diagram detailing operations involved in managing the device and other devices coupled to the host machine, according to one or more embodiments.

FIG. 4 is a process flow diagram 450 illustrating operations involved in managing external devices coupled to the host machine 150, according to one or more embodiments. In operation 402, a coupling of a device to the interface 116 may be detected of the host machine 150. In operation 404, it may be determined, through the operating system 106 of the host machine 150 whether the detected device coupled to the interface 116 of the host machine 150 is same as an other device 102B that is coupled to the interface of the host machine 150 as indicated in a topology file 108 of the operating system 106. In operation 406, the topology file 108 maintained in the operating system 106 may be modified, through the operating system 106 to remove a mapping information of the other device 102B coupled with the interface 116 of the host machine 150 in the topology file 108 to logically decouple the other device 102B from the interface 100 of the host machine 150, and to add a mapping information 122 of the device 102A in the topology file 108 to logically couple the device 102A with the interface of the host machine 150. In operation 408, after the topology file has been modified in operation 406, the configuration file 110 maintained in the firmware 104 of the host machine 150 may be updated to delete the corresponding mapping information associated with the other device 102B that is formerly attached and add the mapping information 122 of the device 102A.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware, firmware, and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

In addition, it will be appreciated that the various operations, processes, and methods disclosed herein may be embodied in a machine-readable medium and/or a machine accessible medium compatible with a data processing system (e.g., a computer devices), may be performed in any order (e.g., including using means for achieving the various operations). Accordingly, the specification and drawings are to be regarded in an illustrative rather than a restrictive sense.

What is claimed is:

1. A method comprising:
    detecting coupling of a hot pluggable device to an interface therefor on a host machine through a firmware of the interface communicating an appropriate message to a driver associated with the hot pluggable device on the host machine;
    deleting, when a topology file of an operating system of the host machine still includes mapping information of another hot pluggable device, distinct from the hot pluggable device, previously coupled to the interface on the host machine and currently physically removed therefrom, the mapping information of the another hot pluggable device from the operating system even prior to the mapping information of the another hot pluggable device being removed from the firmware; and
    adding mapping information of the hot pluggable device to the topology file of the operating system.

2. The method of claim 1, wherein deleting the mapping information of the another hot pluggable device from the operating system includes:
  requesting, through the operating system, the driver for pending Input/Outputs (I/Os) associated with the another hot pluggable device; and
  transmitting, through the driver, a message to the operating system indicating an inability to connect to the another hot pluggable device in accordance with the request.

3. The method of claim 1, further comprising:
  designating the hot pluggable device coupled to the interface as active through the firmware; and
  designating the another hot pluggable device previously coupled to the interface as inactive through the firmware.

4. The method of claim 1, further comprising adding the mapping information of the hot pluggable device to a configuration file of the firmware after the addition thereof to the topology file of the operating system.

5. The method of claim 2, wherein the removal of the mapping information of the another hot pluggable device from the firmware includes:
  completing the pending I/Os through the firmware; and
  receiving, at the driver, a message associated with the completion of the pending I/Os.

6. The method of claim 1, wherein each of the hot pluggable device and the another hot pluggable device is one of: a storage device and an expander device.

7. The method of claim 1, further comprising assigning a unique identifier to each of the hot pluggable device and the another hot pluggable device through the firmware to enable identification thereof.

8. A host machine comprising:
  a processor communicatively coupled to a memory and an interface, the memory including an operating system configured to execute on the host machine and a driver associated with a hot pluggable device configured to be coupled to the interface, the interface including a firmware to detect coupling of the hot pluggable device to the interface and to communicate the detection to the driver, and the driver being implemented such that a mapping information of another hot pluggable device, distinct from the hot pluggable device, previously coupled to the interface and currently physically removed therefrom, is deleted from the operating system even prior to the mapping information of the another hot pluggable device being removed from the firmware when a topology file of the operating system includes the mapping information of the another hot pluggable device, and a mapping information of the hot pluggable device coupled to the interface is added to the topology file of the operating system.

9. The host machine of claim 8, wherein the deletion of the mapping information of the another hot pluggable device from the operating system is based on:
  the operating system requesting the driver for pending I/Os associated with the another hot pluggable device, and
  the driver transmitting a message to the operating system indicating an inability to connect to the another hot pluggable device in accordance with the request.

10. The host machine of claim 8, wherein the firmware is configured to designate the hot pluggable device coupled to the interface as active and the another hot pluggable device previously coupled to the interface as inactive.

11. The host machine of claim 8, wherein the driver is implemented such that the mapping information of the hot pluggable device is added to a configuration file of the firmware after the addition thereof to the topology file of the operating system.

12. The host machine of claim 9, wherein the removal of the mapping information of the another hot pluggable device from the firmware is accomplished through completion of the pending I/Os through the firmware, and reception of a message associated with the completion of the pending I/Os at the driver.

13. The host machine of claim 8, wherein the driver is implemented such that each of the hot pluggable device and the another hot pluggable device is one of:
  a storage device and an expander device.

14. The host machine of claim 8, wherein the firmware is configured to assign a unique identifier to each of the hot pluggable device and the another hot pluggable device to enable identification thereof.

15. A non-transitory medium, readable through a host machine and including instructions embodied therein configured to be executable through the host machine, comprising:
  instructions associated with detecting coupling of a hot pluggable device to an interface therefor on the host machine through a firmware of the interface communicating an appropriate message to a driver associated with the hot pluggable device on the host machine;
  instructions associated with deleting, when a topology file of an operating system of the host machine still includes mapping information of another hot pluggable device, distinct from the hot pluggable device, previously coupled to the interface on the host machine and currently physically removed therefrom, the mapping information of the another hot pluggable device from the operating system even prior to the mapping information of the another hot pluggable device being removed from the firmware; and
  instructions associated with adding mapping information of the hot pluggable device to the topology file of the operating system.

16. The non-transitory medium of claim 15, wherein instructions associated with deleting the mapping information of the another hot pluggable device from the operating system include:
  instructions associated with requesting, through the operating system, the driver for pending I/Os associated with the another hot pluggable device; and
  instructions associated with transmitting, through the driver, a message to the operating system indicating an inability to connect to the another hot pluggable device in accordance with the request.

17. The non-transitory medium of claim 15, further comprising:
  instructions associated with designating the hot pluggable device coupled to the interface as active through the firmware; and
  instructions associated with designating the another hot pluggable device previously coupled to the interface as inactive through the firmware.

18. The non-transitory medium of claim 15, further comprising instructions associated with adding the mapping information of the hot pluggable device to a configuration file of the firmware after the addition thereof to the topology file of the operating system.

19. The non-transitory medium of claim 16, wherein the instructions associated with the removal of the mapping information of the another hot pluggable device from the firmware include:

instructions associated with completing the pending I/Os through the firmware; and instructions associated with receiving, at the driver, a message associated with the completion of the pending I/Os.

20. The non-transitory medium of claim 15, comprising instructions associated with communicating with each of the hot pluggable device and the another hot pluggable device as one of: a storage device and an expander device.

* * * * *